(12) United States Patent
Mahate et al.

(10) Patent No.: US 9,547,695 B2
(45) Date of Patent: Jan. 17, 2017

(54) INDUSTRIAL ASSET EVENT CHRONOLOGY

(71) Applicant: ABB Research Ltd., Zurich (CH)

(72) Inventors: Shakeel Mahamood Mahate, Raleigh, NC (US); Karen J. Smiley, Raleigh, NC (US); Paul F. Wood, Rocklin, CA (US)

(73) Assignee: ABB Research Ltd., Zurich (CH)

( * ) Notice: Subject to any disclaimer, the term of this patent is extended or adjusted under 35 U.S.C. 154(b) by 251 days.

(21) Appl. No.: 13/800,926

(22) Filed: Mar. 13, 2013

(65) Prior Publication Data

US 2014/0279948 A1  Sep. 18, 2014

(51) Int. Cl.
G06F 17/30 (2006.01)
G06Q 10/10 (2012.01)

(52) U.S. Cl.
CPC .......... *G06F 17/3053* (2013.01); *G06Q 10/10* (2013.01)

(58) Field of Classification Search
CPC ................ G05B 2219/31485; G05B 23/0229; G05B 23/0267; G06F 17/3053
See application file for complete search history.

(56) References Cited

U.S. PATENT DOCUMENTS

| | | | |
|---|---|---|---|
| 6,728,724 B1 | 4/2004 | Megiddo et al. |
| 6,750,864 B1 | 6/2004 | Anwar |
| 6,813,532 B2 | 11/2004 | Eryurek et al. |
| 6,959,306 B2 | 10/2005 | Nwabueze |
| 7,117,239 B1 | 10/2006 | Hansen |
| 7,183,905 B2 | 2/2007 | Neubauer et al. |
| 7,221,988 B2 | 5/2007 | Eryurek et al. |
| 7,341,197 B2 | 3/2008 | Muehl et al. |
| 7,493,310 B2 | 2/2009 | Eryurek et al. |
| 7,496,857 B2 | 2/2009 | Stata et al. |
| 7,774,211 B1 | 8/2010 | Mullen et al. |
| 8,126,750 B2 | 2/2012 | Tien et al. |
| 8,219,357 B2 | 7/2012 | Piggott et al. |
| 8,285,500 B2 | 10/2012 | Kreiss et al. |
| 2002/0161940 A1 | 10/2002 | Eryurek et al. |

(Continued)

FOREIGN PATENT DOCUMENTS

| | | |
|---|---|---|
| EP | 1625453 | 2/2006 |
| WO | 2009038947 | 3/2009 |

OTHER PUBLICATIONS

European Search Report cited in European Application No. 14157290.9 dated Nov. 21, 2014, 34 pgs.

*Primary Examiner* — Dinku Gebresenbet
(74) *Attorney, Agent, or Firm* — Cooper Legal Group, LLC

(57) ABSTRACT

Among other things, one or more techniques and/or systems are provided for developing a timeline chronicling events pertaining to an industrial asset. Data is received from a plurality of assets, processed (e.g., to reduce duplicative and/or redundant data), and organized chronologically for presentation in a timeline. The data is further grouped and/or prioritized to display some portions of the data more prominently relative to other portions of the data in the timeline (e.g., which may be hidden). Grouping rules and/or prioritization rules for grouping and/or prioritizing the data may be a function of user interaction with the timeline and/or a function of a machine learning algorithm which may be configured to identify patterns in how users interact with the timeline based upon, among other things, a role the user plays relative to the industrial asset and/or an operating state of the industrial asset.

20 Claims, 7 Drawing Sheets

(56) References Cited

U.S. PATENT DOCUMENTS

| | | |
|---|---|---|
| 2003/0071814 A1 | 4/2003 | Jou et al. |
| 2005/0033466 A1 | 2/2005 | Eryurek et al. |
| 2005/0096774 A1 | 5/2005 | Bayoumi et al. |
| 2005/0108256 A1 | 5/2005 | Wakefield et al. |
| 2005/0278052 A1* | 12/2005 | Bett et al. ............... 700/108 |
| 2007/0239408 A1* | 10/2007 | Manges et al. ............... 703/2 |
| 2008/0086345 A1 | 4/2008 | Wilson et al. |
| 2009/0327102 A1 | 12/2009 | Maniar et al. |
| 2012/0022907 A1* | 1/2012 | Fidler ............... G06Q 10/06 705/7.14 |
| 2012/0143970 A1 | 6/2012 | Hansen |
| 2012/0326864 A1 | 12/2012 | Kelsey et al. |
| 2013/0211797 A1* | 8/2013 | Scolnicov ............ G06Q 50/06 703/2 |
| 2014/0032079 A1* | 1/2014 | Varma et al. ............... 701/101 |

* cited by examiner

INDUSTRIAL ASSET EVENT CHRONOLOGY

BACKGROUND

The present application relates to industrial assets and more particularly to systems and/or techniques for chronicling events pertaining to an industrial asset, which may be displayed graphically in a timeline. The systems and/or techniques find particular application to industrial assets of a power system but may also find applicability in non-power related industries where it may be useful to acquire data pertaining to an industrial asset from a plurality of data sources and to present at least some of the data to a user chronologically in an interactive timeline which integrates the data from the plurality of data sources.

A power system comprises a network of electrical components or power system equipment configured to supply, transmit, and/or use electrical power. For example, a power grid (e.g., also referred to as an electrical distribution grid) comprises generators, transmission systems, and/or distribution systems. Generators are configured to produce electricity from combustible fuels (e.g., coal, natural gas, etc.) and/or non-combustible fuels (e.g., such as wind, solar, nuclear, etc.). Transmission systems are configured to carry or transmit the electricity from the generators to loads. Distribution systems are configured to feed the supplied electricity to nearby homes, commercial businesses, and/or other establishments.

Electrical components of such a system include, among other things, turbines, transformers, circuit breakers, capacitors, voltage regulators, and power lines, for example. Often, such equipment is designed to lasts decades and is routinely (or continuously) monitored and/or inspected to assess the health of the equipment and develop maintenance schedules for the equipment to mitigate risk of a failure (e.g., which may result in power loss). By way of example, a sensor onboard a transformer may be configured to intermittently or continuously provide readouts indicative of a temperature of oil within the transformer and/or indicative of chemical concentrations in the oil. Such information is typically stored in a database and is used to assess the present health of the transformer (e.g., where a temperature above a temperature threshold or a carbon dioxide ($CO_2$) concentration above a $CO_2$ threshold may indicate the transformer is in need of maintenance).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to an aspect, a method for chronicling events pertaining to an industrial asset is provided. The method comprises receiving data pertaining to the industrial asset from a plurality of sources and organizing the data chronologically. The method also comprises grouping the data into a first set of bins, where a first bin of the first set represents first data yielded from a first set of one or more sources of the plurality of sources and a second bin of the first set represents second data yielded from a second set of one or more sources of the plurality of sources. The method also comprises providing for presentation of a timeline of the data in a first manner to chronicle events pertaining to the industrial asset, where the first data is displayed more prominently in the timeline than the second data.

According to another aspect, a system for chronicling events pertaining to an industrial asset is provided. The system comprises one or more processing units and memory configured to store instructions that when executed by at least some of the one or more processing units perform a method. The method comprises receiving data pertaining to an industrial asset from a plurality of sources and organizing the data chronologically. The method also comprises prioritizing the data for presentation in a timeline and providing for presentation of the timeline in a first manner to chronicle events pertaining to the industrial asset, the timeline presented in the first manner based upon the prioritizing.

According to yet another aspect, a graphical user interface configured to display a timeline chronicling events pertaining to an industrial asset which has been developed from data yielded from a plurality of sources is provided. The graphical user interface comprises a timeline modification window comprising a listing of one or more data types of data available to be presented in the timeline. The graphical user interface further comprises a selection bar comprising a predefined formats element configured to list one or more available timeline formats for a user to select, where a manner in which the timeline is presented is a function of a selected format, and where the formats respectively corresponding to one or more roles of users relative to the industrial asset. It will be appreciate that multiple of such elements can be included in the graphical user interface.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
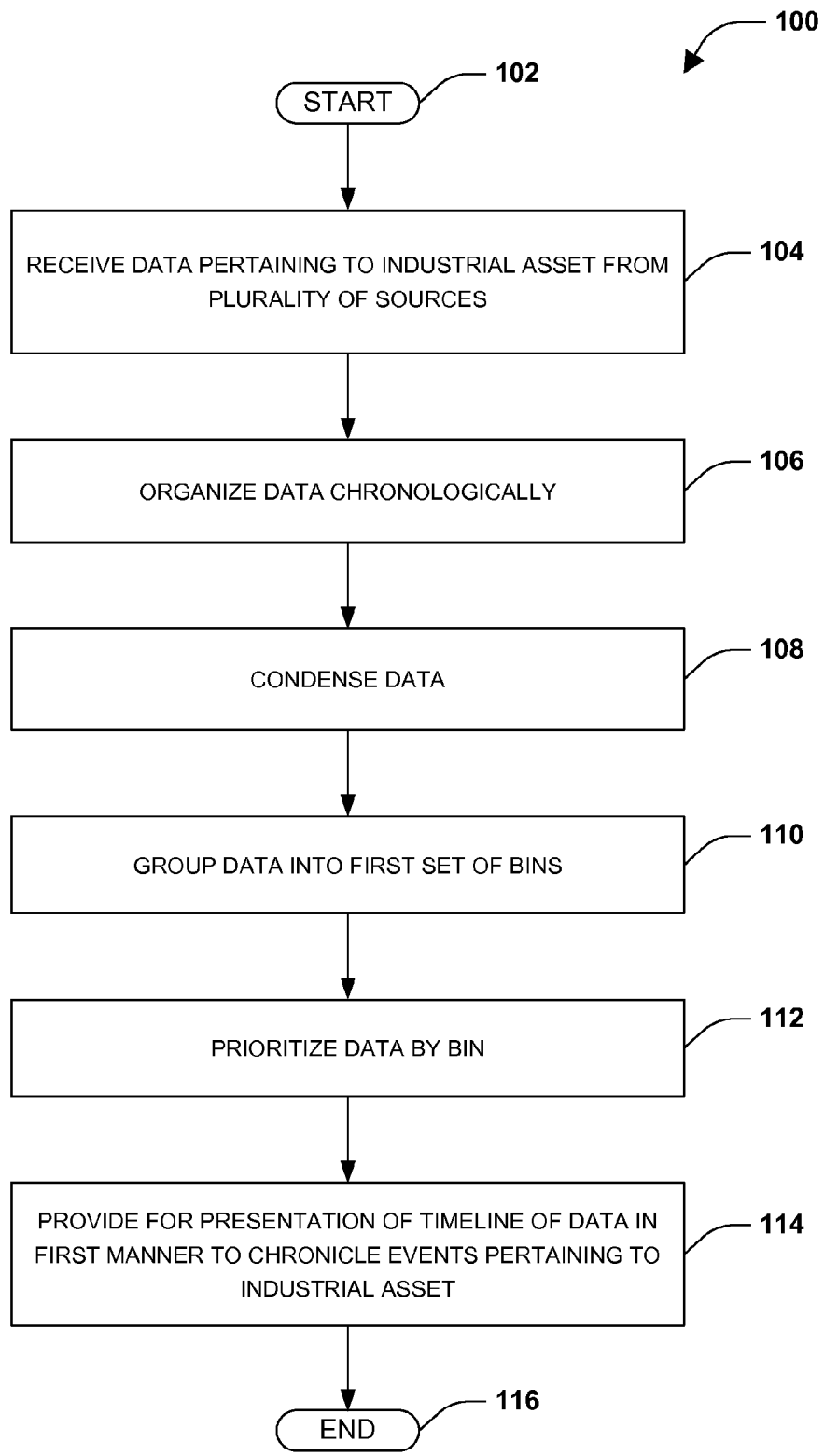
FIG. 1 is a flow diagram illustrating an example method for chronicling events pertaining to an industrial asset.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

A power system comprises thousands if not millions of electrical components. Utility providers and other entities routinely monitor and/or inspect such electrical components to assess the health of various electrical components, assess environmental risk posed by the various electrical components, assess efficiency of the various electrical components, detect early signs of failure, etc.

Numerous techniques are used to make such assessments and/or detections. For example, some electrical components comprise sensors that are configured to measure one or more properties of such electrical components (e.g., internal temperature, ambient air temperature, dissolved gas concentration, load, etc.) and/or are configured to provide readouts indicative of present operating conditions of such electrical components. Further, on-site field test and/or inspections may be performed by trained technicians to inspect the electrical components for damage, signs of failure, environmental risk, etc. Often, information that results from such readouts, field tests, and/or inspections is recorded in performance databases, which maintain the data for future use (e.g., such as to develop a maintenance schedule, to compile compliance reports or other reports, etc.).

When a user desires to review data related to an electrical component such as to review past performance of the electrical component and/or to generate a report, the user may desire to compare numerical data stored in the performance database with events that have occurred to the electrical component, such as outages, repairs, inspection schedules, etc. To do so, the user has conventionally overlaid graphs or lists of pertinent numerical data (e.g., acquired from the performance database(s)) with a calendar or other visualization representing data pertaining to events (e.g., acquired from a maintenance database(s)). While overlaying such information to develop a profile of an electrical component has been useful, such a presentation is not easily manipulatable by a user to gain a rich understanding of past performance and/or does not easily allow events to be correlated with the numerical data.

Accordingly, systems and/or techniques for generating a graphical user interface depicting a timeline that chronicles events pertaining to an industrial asset (e.g., a history of the industrial asset), such as an electrical component, are provided. Data from multiple sources, such as performance database(s) and/or maintenance database(s), for example, are integrated into a representation which combines sensory information from sensors, field tests, visual or other sensory inspections, etc. with events that have occurred to the industrial asset (e.g., such as maintenance logs, compliance reports, outages, etc.). Data presented in the timeline may be aggregated into categories or bins based upon the type of industrial asset to which the timeline pertains, user input, present operating state of the industrial asset, intended use of the timeline, etc. Moreover, in some embodiments, a first portion of data represented in the timeline may be presented differently (e.g., more distinctly) than a second portion of data represented in the timeline as a function of the type of industrial asset to which the timeline pertains, user input, present operating state of the industrial asset, intended use of the timeline, etc., for example. In some embodiments, the timeline is further manipulatable, such as by a user, to alter how the data is presented and/or to alter the relative distinctiveness of data presented in the timeline (e.g., zooming in to a smaller timeframe, zooming out to a larger timeframe, etc.).

It will be appreciated that an industrial asset may refer to a single piece of equipment, such as a transformer, or may refer to a collection of equipment, such as a substation. In this way, a timeline can be devised for the transformer and/or a timeline can be devised for a substation that includes the transformer, for example. Moreover, a single source of data may be associated with one or more industrial assets. By way of example, a first data source may be configured to obtain and/or store temperature data yielded from all transformers located within a defined geographic region.

FIG. 1 illustrates an example method 100 for chronicling events pertaining to an industrial asset, such as an electrical component. For example, method 100 describes a technique for combining numerical data, such as derived from sensors, field tests, visual/audio inspections, etc. with data pertaining to events (e.g., shutdowns, outages, maintenance reports, compliance reports, etc.) to generate a visual representation, such as a timeline, that integrates event data with numerical data to describe a history of the industrial asset, for example.

The example method 100 begins at 102, and data pertaining to the industrial asset is received from a plurality of sources at 104. The plurality of sources can include, among other things, enterprise resource systems (ERPs), enterprise asset management systems (EAMs), relational databases, columnar databases, business intelligence systems (BIs), databases associated with a manufacturer(s) of the industrial asset (e.g., manufacturer databases), master data management repositories (MDMs), operational historians, and/or other sources from which data pertaining to the industrial asset of interest and/or similar industrial assets (e.g., configured similarly to the industrial asset of interest and/or performing a same function/role as the industrial asset of interest, etc.) may be acquired.

The received data may include, among other things, word processing documents, spreadsheet files, portable document format (PDF) documents, photographs, videos, audio recordings, etc. Moreover, the types of information represented by such data may include numerical information (e.g., representative of discrete events, such as field test, and/or streamed events, such as substantially continuous readouts from sensors), textual information (e.g., which may be structured, semi-structured, and/or unstructured), and/or multimedia information (e.g., such as photographs, videos, audio recordings, etc.).

In some embodiments, one or more sources are configured to store data pertaining to a plurality of industrial assets. In such embodiments, the data may be automatically or manually tagged with an identifier that is unique to the industrial asset (e.g., relative to other industrial assets of a fleet) to identify data within the one or more sources that pertains to the industrial asset of interest (e.g., for later retrieval and delivery at 104). By way of example, readouts from one or more sensors embedded within the industrial asset may be automatically tagged with an identifier when the data is readout from the sensor to correlate the data yielded from the sensor with the industrial asset. As another example, data yielded from field-tests and/or on-site inspections may be manually tagged by a technician performing the field tests and/or inspections, for example. Moreover, data pertaining to work-orders, outages, compliance reports, etc. may be tagged when a ticket and/or report is generated, for example.

In some embodiments, different identification techniques may be utilized by different sources. Accordingly, a first source may tag data associated with the industrial asset of interest with a first identifier (e.g., a first serial number) and a second source may tag data associated with the industrial asset of interest with a second identifier (e.g., a second serial number). In such an embodiment, prior to receiving the data at 104, one or more identifiers that are associated with the industrial asset of interest are determined. Techniques of varying difficulty and/or scope may be utilized to make such a determination. For example, in some embodiments, a list of identifiers associated with the industrial asset of interest are uploaded and used to identify data for retrieval and subsequent receipt at 104. In other embodiments, a list of identifiers is compiled based upon information known about the industrial asset (e.g., manufacturing date, location, etc.). For example, a first source may list a first industrial asset, having a first identifier, as being located at a first geographic position and a second source may list a second industrial asset, having a second identifier, as being located at a second geographic position. If the first geographic position and the second geographic position are substantially similar (e.g., have similar GPS coordinates or other similar location information), it may be determined that the first identifier and second identifier relate to a same industrial asset (e.g., the first industrial asset and the second industrial asset are the same asset). Further, in some embodiments, such a determination may be verified by comparing the manufacturing date of the first industrial asset with the manufacturing date of the second industrial asset to determine if the manufacturing dates are the same and/or by comparing other data pertaining to respective industrial assets.

In some embodiments, at least a portion of the received data may be pre-processed prior to retrieval and/or receipt at 104. By way of example, a portion of the data yielded from sensors and/or field tests may be pre-processed (e.g., cleaned) prior to receipt at 104 to normalize such data, identify outliers in such data, etc. In other embodiments, at least a portion of the received data is raw data (e.g., such as received from the sensor and/or the field test), which has not been pre-processed, for example.

Moreover, in some embodiments, at least a portion of the data that is stored at one or more sources may have been analyzed prior to receipt at 104. Such an analysis may have included interpolating and/or extrapolating the data to make predictions from the data, for example. In some instances, the data related to such predictions may be stored in one or more of the sources from which data is received and included in the data received at 104. By way of example, temperature data related to the industrial asset may be interpolated and/or extrapolated to estimate the temperature at a point in time when the temperature was not actually measured and/or to estimate the temperature of the industrial asset at a desired time in the future. In this way, the data received at 104 may include data yielded from field-tests, sensors, maintenance databases, reports, etc. and synthetic data such as yielded from models, calculations, etc. which utilize, as inputs, at least some of the data yielded from the field tests, sensors, reports, etc.

At 106 in the example method 100, the data received at 104 is organized chronologically. That is, the data is organized by date and time to arrange the data in a manner suitable for presentation in a timeline.

In some embodiments, a first portion of the data may be asynchronous with a second portion of the data due to the clocking scheme utilized when generating and/or storing the various types of data that are received from the plurality of sources. Such a problem may be exacerbated by the existence of data being stored in numerous sources associated with various types of databases, for example. Accordingly, in some embodiments, organizing the data chronologically at 106 further comprises synchronizing the first portion of the data with the second portion of the data using a clock synchronization scheme. By way of example, the clock synchronization scheme may comprise altering first date information (e.g., calendar format, time format, etc.) associated with the first portion of the data to standardize the first date information with second data information associated with the second portion of the data. It may be appreciated that various clocking synchronization schemes are contemplated for use herein to perform such a synchronization of the data yielded from the plurality of sources.

At 108 in the example method 100, the data is reviewed and condensed. Condensing such data is configured to at least one of reduce an amount of duplicate data (e.g., to mitigate duplicate entries appearing in the timeline) and/or to reduce an occurrence of redundant data associated with a frequently occurring event (e.g., to reduce an amount of data that is superfluous for purposes of the timeline).

In some embodiments, condensing the data to reduce an amount of duplicate data may comprise identifying a first subset of data and a second subset of data having similar date information (e.g., day and time information) and comparing the first subset with the second subset to determine whether the second subset is a duplicate of the first subset. As an example, dissolved gas readings may be stored in multiple sources (e.g., where data stored in a first source of the multiple sources is utilized for health tracking and data stored in a second source of the multiple source is utilized for compliance analysis). When the data is received at 104, data associated with the dissolved gas readings may be received from two or more sources (e.g., causing duplicate data to be received). After the data is organized chronologically at 106, a check may be performed to determine whether two or more subsets of data are present having a similar (e.g., the same) date information. If two or more subsets of data are present that have similar date information, such data may be further analyzed to determine whether the two or more subsets are, in fact, duplicate subsets (e.g., such as by comparing the content of respective subsets and/or metadata associated with respective subsets (e.g., such as data creator, etc.)). In this way, a duplicate copy of the dissolved gas readings may be identified and discarded or otherwise ignored for purposes of creating the timeline, for example.

In some embodiments, redundant data (e.g., which may not be an exact duplicate) is also discarded or otherwise ignored to condense the data at 108. By way of example, some data may correspond to frequently occurring events (e.g., temperature readings, dissolved gas readings, ambient air readings, etc.), causing a large amount of data pertaining to such events to amass. In some embodiments, it may not be necessarily to include all of the data pertaining to such a frequently occurring event in the timeline, so a portion of the data may be discarded to reduce an amount of data present in the timeline. By way of example, data pertaining to the temperature of the industrial asset may be acquired once per minute. Such a level of granularity with respect to temperature may not be necessary for inclusion into the timeline, and perhaps one temperature reading per day is sufficient (e.g., where changes in temperature do not exceed some differential threshold). Accordingly, a portion of the data corresponding to temperature may be discarded or otherwise ignored to reduce a total amount of data corresponding to temperature that is represented in the timeline.

In some embodiments, where condensing data comprises condensing redundant data corresponding to a frequently occurring event, the redundant data may be condensed according to a set of condensing rules. Such condensing rules may be user specified (e.g., where the user specifies the granularity with which to represent temperature data in the timeline) and/or model specific (e.g., where the granularity is specified according to the model utilized to generate the timeline which may be a function of the intended viewer of the timeline, the type of industrial asset the timeline pertains to, a present operating state of the industrial asset, etc.). Example condensing rules may relate to a frequency with which to retain data (e.g., one reading per day), how to select data to retain and/or to discard (e.g., select data associated with highest temperature reading over the period of a time and discard remaining data acquired over the period of time), and/or how to combine data to reduce redundancy (e.g., average the temperature readings over a day to compute an average temperature for the day), for example.

In some embodiments, synthetic events may be created based upon the condensing. By way of example, where redundant data is condensed by averaging a numerical value associated with the data (e.g., such as temperature), the average numerical value may not match any actual value represented by the redundant data. For example, the average temperature for a day may not be equal to any reading used to compute the average temperature. Accordingly, the daily average may be a synthetic event that is created when the data is condensed at 108 (e.g., because the received data did not include a daily average).

At 110 in the example method 100, data is grouped into a first set of bins or categories. A first bin of the first set represents first data yielded from the one or more sources of the plurality of sources and a second bin of the first set represents second data yielded from one or more sources of the plurality of sources. For example, data pertaining to internal temperatures of the industrial asset and data pertaining to ambient air temperatures proximate the industrial asset may be grouped into a first bin. Data pertaining to intentional shutdowns (e.g., for maintenance) and/or data pertaining to unintentional outages may be grouped into a second bin. Data pertaining to routine maintenance schedules and/or data pertaining to inspection reports may be grouped into a third bin, etc.

In some embodiments, the data is categorized (e.g., as pertaining to internal temperatures, outages, and/or maintenance schedules, etc.) prior to the data being grouped into bins at 110. Various techniques may be used to categorize the data. For example, the data may be categorized based upon the source from which the data was received at 104. By way of example, a first source may comprise merely temperature readings and a second source may comprise merely maintenance reports. Accordingly, in some embodiments, data received from a first source is tagged with a first identifier associated with the first source to categorize the data as temperature data and data received from a second source is tagged with a second identifier associated with the second source to categorize the data as maintenance data. In still other embodiments, grouping the data in bins at 110 may comprise reading the data (e.g., and converting non-readable files, such as images, into readable files) and/or reading metadata associated with the data to categorize the data.

In some embodiments, the number of bins into which the data is grouped and/or criteria for grouping the data may be specified by a set of one or more grouping rules. The grouping rules may be defined for a fleet of industrial assets (e.g., where the same set of grouping rules applies regardless of whether the industrial asset is a transformer, capacitor, circuit breaker, etc.), may be asset-type specific (e.g., where a first set of grouping rules applies to a dry transformer and a second set of grouping rules applies to a wet transformer), and/or may be asset specific (e.g., where a first set of grouping rules that applies to a first transformer may be different than a second set of grouping rules that applies to a second transformer even though the first transformer and second transformer may be a same type/class of transformer).

In some embodiments the grouping rules are user defined. In other embodiments, the grouping rules are defined by a training algorithm configured to derive the grouping rules as a function of past interactions of one or more users with timelines (e.g., such as interactions with timelines pertaining to industrial assets of a similar type to the industrial asset of interest). In still other embodiments, the grouping rules may be a function of a present operating state of the industrial asset. For example, a first set of grouping rules may be defined that are applied when the industrial asset is operating within a defined set of parameters and a second set of grouping rules may be defined that are applied when the industrial asset is operating outside the defined set of parameters (e.g., when a sensor reading deviates from a permissible range and/or an inspection report indicates a potential problem).

At 112, the data is prioritized by bins, such that one or more bins are assigned a higher ranking than one or more other bins. By way of example, the first bin may be assigned a higher ranking or priority than the second bin, causing data of the first bin to also be assigned a higher ranking or priority relative to data of the second bin. As will be further described below, in some embodiments, the manner and/or distinctiveness with which data is presented on the timeline may be a function how the data is prioritized. For example, data comprised within a bin having a higher ranking or higher priority may be displayed more prominently than data comprised within a bin having a low ranking or lower priority.

The data may be prioritized based upon a set of prioritization rules, which may be user defined, defined by an algorithm configured to predict how a user is likely to desire the data to be prioritized, and/or defined based upon a present operating state of the industrial asset. Moreover, a set of prioritization rules may apply to a fleet of industrial assets (e.g., of varying type and/or purpose), may be asset-type specific, and/or may be asset specific.

By way of example, in one embodiment, a series of user-defined prioritization rules are derived, where the applicability of various rules may depend upon a present operating state of the industrial asset. For example, a first portion of the series may apply when the industrial asset is operating within a normal state (e.g., where a normal state may be determined based upon readouts from one or more sensors embedded within the industrial asset) and a second portion of the series may apply when the industrial asset is operating outside what is consider to be normal (e.g., one or more readouts may be outside of a permissible range and/or a recent inspection report may indicate abnormalities with the industrial asset). In this way, how the data is prioritized may be a function of user-defined rules and a present operating state of the industrial asset, for example.

As another example, the prioritization rules may be derived via a training algorithm, such as a neural network algorithm, linear regression algorithm, Bayesian network algorithm, support vector algorithm, or other machine learning algorithm, for example. In some embodiments, such a training algorithm may utilize as inputs past user behavior regarding interactions with similar timelines (e.g., pertaining to the industrial asset of interest and/or other industrial assets) and/or known operating conditions of the industrial asset. By way of example, upon the occurrence of an outage, history may indicate that users typically focus on particular data that is pertinent to the outage (e.g., such as temperature data, dissolved gas concentration data, recent video or audio data, etc. for a transformer). Accordingly, if the timeline indicates that a recent outage has occurred, the training algorithm may create a set of prioritization rules for the data that causes data pertaining to such information to be ranked higher than other data that has historically not be of interest to a user immediately upon an occurrence of an outage.

At 114 in the example method 100, a timeline of data is provided for presentation (e.g., to a user) in a first manner to chronicle events pertaining to the industrial asset. Such a timeline can, for example, be adapted according to user preferences and/or preferences of users within a region in which the timeline is presented. For example, the timeline can be localized to illustrate events in local time for a region in which the timeline is provided for presentation and/or can be formatted in a 12-hour format or 24-hour format based upon user preference, for example. Moreover, the data presented in the timeline can be translated into a native language for the region in which the timeline is provided for presentation, for example.

The manner in which various data is presented in the timeline may be a function of the prioritization at 112 and may be modifiable based upon user input and/or user interaction with the timeline. For example, in some embodiments, the timeline may be initially presented in a manner that depicts an entire lifespan of the industrial asset from the day the industrial asset was manufactured until the present day or some day in the future. A select number of events and/or a select bin of data may be presented more prominently in the initial presentation than other events and/or other bins of data. For example, the timeline, as initially presented in the first manner, may depict outages lasting longer than a specified period of time prominently, with other data being displayed less prominently and/or hidden.

In some embodiments, the timeline provided for presentation is interactive. For example, a user may select which types of data to be presented prominently and/or may select a portion (e.g., particular date range) of the timeline, etc. When a user selects a portion of the timeline, the prominence of data associated with the selected portion of the timeline may be increased (e.g., by zooming in on the selected portion a portion of the timeline). As another example, a user may select a particular event to view additional data pertinent to that event. For example, the user may select a particular outage and the timeline may be altered to depict data related to the outage (e.g., such as a temperature of the industrial asset in the days leading up to the outage, inspection data related to inspections performed in close temporal proximity to the outage, etc.). In this way, a user may interact with the timeline to change how data is presented, causing the timeline to be provided for presentation in a second manner (e.g., where the second manner displays different data prominently, displays a different timespan, etc.).

At 116, the example method 100 ends.

In some embodiments, data stored in one or more of the plurality of sources and pertaining to the industrial asset is updated and/or new data is acquired pertaining to the industrial asset. In such embodiments, the timeline may be periodically or intermittently updated according to the newly received data. By way of example, to initially construct a timeline, a request for data pertaining to the industrial asset may be issued, and data corresponding to the request may be retrieved from the plurality of sources. The data received at 104 may be incrementally refreshed at routine intervals and/or upon identification of a change to the retrieved data (e.g., such as indicated by a ping from the source indicative of a change and requesting a service to re-crawl the source to extract the updated/new data). In other embodiments, a full refresh (e.g., as opposed to incremental refreshes) may be performed upon the occurrence of a specified event (e.g., a percentage change to data stored by a source has occurred, a specified amount of time has lapsed since the last full refresh, etc.). In still other embodiments, an incremental refresh and/or a full refresh of the data may be initiated at the request of a user (e.g., such that data is received on demand). Upon new or updated data being received, at least some of the foregoing actions may be repeated to update the timeline provided for presentation at 114.

Figure 2:
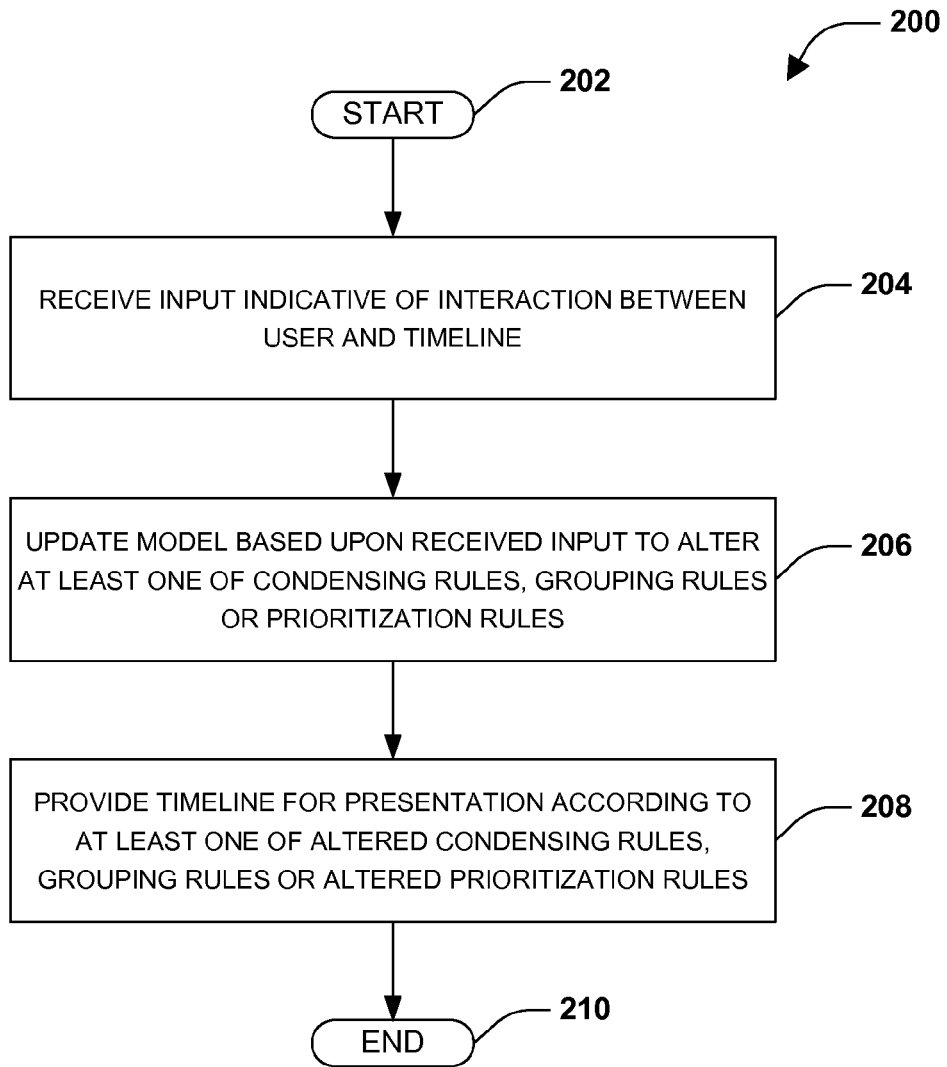
FIG. 2 illustrates an example method for updating a model based upon user input to alter at least one of grouping rules or prioritization rules utilized for binning and/or prioritizing data to be presented in a timeline.

FIG. 2 illustrates an example method 200 for training a training algorithm (e.g., a machine learning algorithm) to define or redefine a set of rules utilized for sorting the data. By way of example, the training algorithm may define or redefine a set of condensing rules for condensing data (e.g., at 108 in FIG. 1), grouping rules utilized for binning data (e.g., at 110 in FIG. 1) and prioritization rules for prioritizing data (e.g., at 112 in FIG. 1), respectively. In this way, the algorithm may adjust how one or more timelines are presented pertaining to one or more industrial assets.

The example method 200 begins at 202 and input indicative of an interaction between a user and a timeline is received at 204 and stored in a knowledge base. The input may include information regarding the identity of a user and/or the role a user plays at the organization and/or plays in relation to the industrial asset (e.g., inspector, maintenance technician, compliance officer, auditor, etc.) and/or information pertaining to how the user interacts with the timeline (e.g., such as what data the user selects in the timeline and/or how the user manipulates a view of the timeline). In this way, a record is maintained of how one or more users interact with a timeline to facilitate making predictions regarding how futures users (e.g., which may be the same users or different users) are expected to interact with the timeline (e.g., to update a manner in which the timeline is presented to a future user to increase the distinctiveness of data that the user is likely to find relevant and/or to minimize navigation of the timeline by the future user).

At 206 in the example method 200, a model utilized to develop at least one of condensing rules (e.g., specifying criteria for determining whether data is redundant and/or duplicate and/or specifying how redundant/duplicate data is to be treated), grouping rules (e.g., specifying how data is to be binned), and/or prioritization rules (e.g., specifying how data or bins of data are to be prioritized) is updated based upon the received input, or the input that has accumulated in the knowledge base is used to alter at least one of the condensing rules, grouping rules, and/or prioritization rules. The model may be developing using supervised learning algorithms, active learning algorithms, and/or other algorithms that analyze past user interaction with a timeline to predict or model how a future user is likely to interact with the timeline and/or other timelines pertaining to other industrial assets.

The models are configured to alter one or more condensing rules, grouping rules, and/or prioritizing rules based upon how a user(s) has historically interacted with the timeline. By way of example, data pertaining to videos and images may have historically been binned together according to a first set of grouping rules and assigned as same priority in a timeline. However, based upon input received at 204, a model may determine that users frequently interact with the timeline in a manner that causes the image data to be enlarged while users interact with video data infrequently. Accordingly, the model may adjust the grouping rules to provide for binning the image data to be binned in a different bin than the video data.

In some embodiments, the model may further consider how a user interacts with the timeline in conjunction with the operating state of the industrial asset. By way of example, the model may analyze at least some of the data that was received to develop the timeline with which the user interacted to identify trends (if any exist) between the user interaction and the analyzed data. By way of example, when an internal temperature of the industrial asset increases above a specified threshold, users may interact with the timeline in a manner than causes internal temperature data for the past month, recently acquired images of the transformer, and/or ambient air temperature data for the past month to be presented more distinctly on the timeline than initially presented. Accordingly, the model may develop a prioritization rule(s) that provides for increasing the priority of at least some of the internal temperature data, recently acquired images, and/or ambient air temperature data relative to the priority of such data when the internal temperature is less than the specified threshold. As another example, the model may analyze at least some of the data that was received at 204 to determine whether the user interacts with the timeline differently when a first load is applied to the industrial asset relative to the way in which the user(s) interact with the timeline when a second load is applied. As still another example, the model may analyze at least some of the data that was received at 204 to determine whether the user interacts with the timeline differently when the industrial asset is operating normally relative to the way in which the user(s) interact with the timeline when the industrial asset experiences an intentional shutdown and/or an unintentional outage, for example.

In other embodiments, the model may further consider how the user interacts with the timeline in conjunction with the particular user and/or the role of the user relative to the industrial asset. By way of example, a compliance officer may interact with a timeline differently than a maintenance technician because the compliance offer may be interested in a different subset of data and/or a different timespan of data relative to the maintenance technician. As an example, a maintenance technician may be focused merely on data pertaining to events and/or recordings that have occurred within the last month where a compliance officer may be focused on data pertaining to events and/or recordings that have occurred within the last year. Accordingly, the input received at 204 may comprise an indication of who the user is and/or the role the user plays relative to an industrial asset to which the timeline pertains, and the model may analyze the interaction of the user with the timeline to make a prediction(s) regarding how the user or other users having a same or similar role may interact with the timeline in the future. In this way, the model can adjust at least one of the condensing rules, grouping rules, and/or prioritization rules as a function of the user to whom the timeline is to be presented. By way of example, returning to the example of the compliance officer and the maintenance technician, the model may update the prioritization rules to prioritize data acquired within the last month if the user to whom the timeline is going to be presented is a maintenance technician and to prioritize data acquired within the last year if the user to whom the timeline is going to be presented is a compliance officer. In other embodiments, the model may adjust the grouping rules to bin data in a first manner when the user to whom the timeline is to be presented is a compliance officer and to bin the data in a second manner when the user is a maintenance technician, for example.

Although specific reference is made herein to updating a model to alter at least one of the condensing rules, the grouping rules and/or the prioritization rules, in some embodiments, the model may be further updated to adjust how data is received and/or what data is included in the timeline. By way of example, in some embodiments, the model may identify data that is being received at 104 in FIG. 1 but rarely being viewed by a user. Accordingly, the model may request that such data stop being received. As another example, the model may identify that users often attempt to view particular types of data at a high level of granularity. Accordingly, the model may request a system to retrieve more data of that particular type and/or to identify additional sources that store that particular type of data and/or similar types of data (e.g., which a user may also find relevant). Where such additional data of a desired type is unavailable, the model may request that the additional data be generated. For example, the model may recognize that users are particularly interested in data associated with dissolved gas concentrations and may request that measurements of dissolved gas concentrations be acquired more frequently to increase available data associated with dissolved gas concentrations. Moreover, the model may be updated to adjust how data is condensed by adjusting one or more condensing rules. For example, the model may adjust how data pertaining to frequently occurring events and/or duplicate data is handled.

At 208 in the example method 200, a timeline is presented for presentation according to at least one of the altered condensing rules, altered grouping rules, and/or altered prioritization rules. The timeline provided for presentation at 208 may pertain to a same industrial asset as the timeline with which the user interacted at 204 or may be a different industrial asset. By way of example, the input received at 204 may pertain to how a user interacted with a first timeline pertaining to a first transformer. While users may interact with a second timeline pertaining to a second transformer in a slightly different way, a similar set of grouping rules and/or prioritization rules may be applicable. Accordingly, a model or merely a slight variation thereof may be used to construct or update the first timeline may also be utilized to construct the second timeline, which is provided for presentation 208.

In embodiments where the first timeline with which the user interacted at 204 is the same timeline that is provided for presentation at 208 (e.g., the timelines pertain to the same asset), the manner in which that timeline is presented for interaction with the user at 204 may nevertheless be different than the manner in which the timeline is provided for presentation at 208. By way of example, one or more datasets may have an increased distinctiveness in the timeline provided for presentation at 208 relative to the distinctiveness of such a dataset(s) when provided for presentation for interaction with a user at 204. That is, the timeline may be presented in a first manner at 204 and a second manner at 208, for example, where the second manner presents the timeline or data therein differently than the first manner.

The example method 200 ends at 210.

Figure 3:
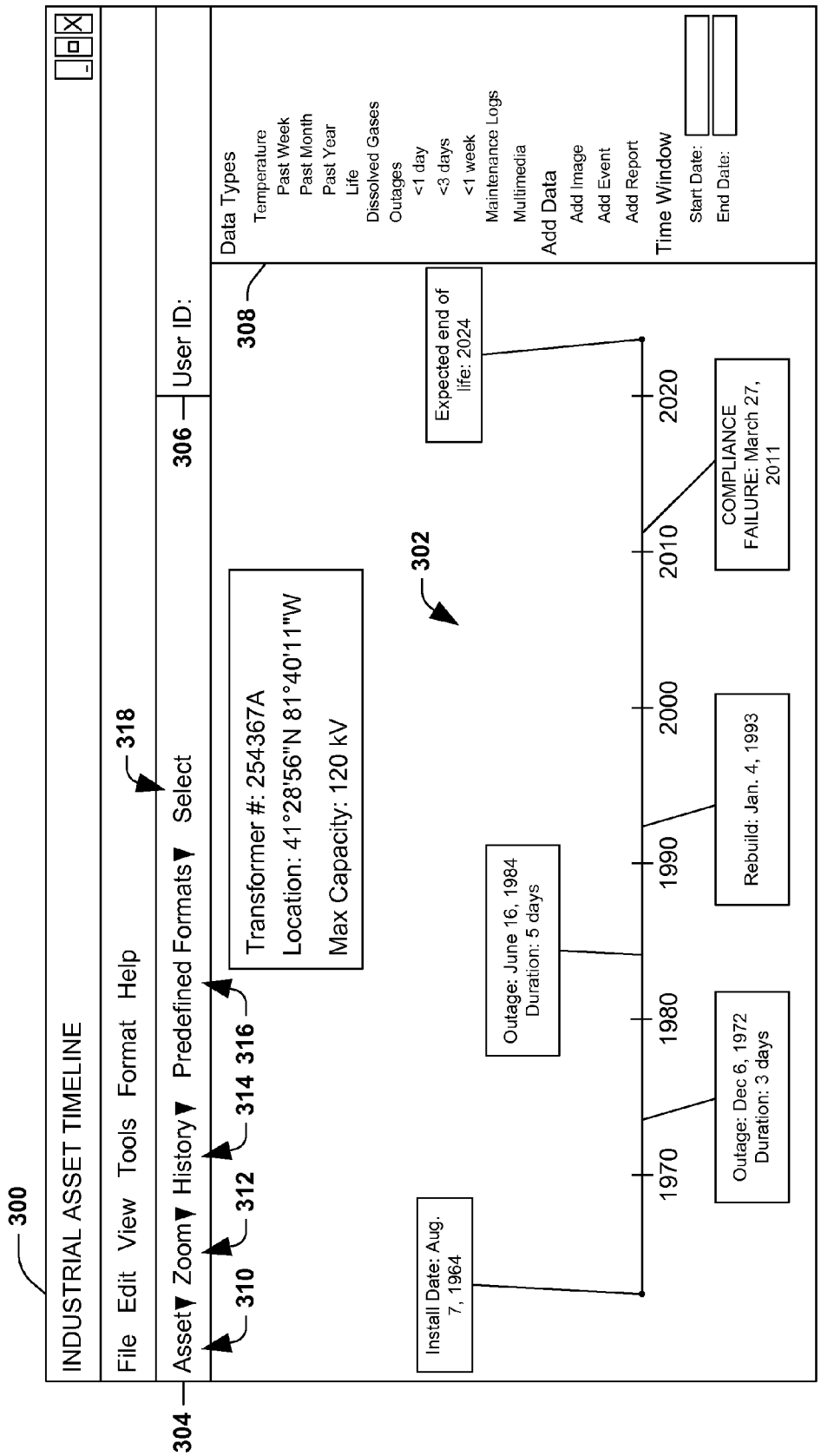
FIG. 3 illustrates an example graphical user interface of a program configured to display a timeline pertaining to an industrial asset.

FIGS. 3-4 illustrate a graphical user interface 300 of a program configured to present a timeline 302 to a user. The program may be a dedicated program (e.g., designed for the purpose of displaying such a timeline) or a non-dedicated timeline, such as a browser program, that facilitates presenting the timeline 302 to a user. The timeline 302 is intended to present data that has been gathered from a plurality of sources and has been arranged chronologically to chronicle events pertaining to an industrial asset. Moreover, the timeline 302 is configured to be interactive and/or to dynamically change what data is presented and/or the distinctiveness of presented data as a function of user input, for example.

With respect to FIG. 3, a first instance of a graphical user interface 300, displaying a timeline 302 of an industrial asset in a first manner, is provided. In the example embodiment, the industrial asset is a transformer. Example features of the graphical user interface 300 include a selection bar 304, a user identification field 306, and a timeline modifier window 308.

The selection bar 304 comprises a plurality of user-selectable elements, such as drop-down menus, that comprise one or more commands which alter how the timeline 302 is viewed and/or facilitate fast-switching between various timelines. For example, the selection bar 304 of the illustrated embodiment comprises an asset element 310, a zoom element 312, a history element 314, a predefined formats element 316, and a selection element 318.

The asset element 310 may list other transformers that are similar in configuration to the presently displayed transformer. In some embodiments, the user can select a listed transformer to view a timeline corresponding to the listed transformer (e.g., allowing the user to compare events corresponding to the listed transformer to events corresponding to the presently displayed transformer). The zoom element 312 comprises commands which, when selected by the user, increase a magnitude of the timeline 302 in the display area (e.g., so that the user can view a portion of the timeline 302 in more detail) and/or decrease a magnitude of the timeline 302 (e.g., to view a larger portion (e.g., date range) of the timeline 302 within the display area). The history element 314 is configured to display previous configurations of the timeline 302 (e.g., so that if the user modifies how the timeline 302 is presented, the user can quickly navigate back to a previous view). The predefined format element 316 is configured to present the user with various predefined timeline formats (e.g., where a first format may group data differently than a second format or may cause data to be prioritized differently). For example, a user interested in compliance may select a compliance format to increase a distinctiveness of data that is typically of interest to a compliance officer and decrease (e.g., or hide) data that is typically of little interest to a compliance officer. The selection element 318, when selected, is configured to engage a selection tool which allows the user to highlight or focus upon a desired portion of the timeline 302 to view additional data related to the highlighted or focused upon portion.

The user identification field 306 is configured to receive user input regarding the identity or role of the user. By way of example, a user may input his/her employee identification tag, email address, title, etc. into the user identification field 306. Information input into such a field may be utilized to among other things, authorize the user to view the timeline 302, filter the types of data available to the user (e.g., so that company sensitive data is not released to a non-authorized entity), and/or determine a manner in which to present the data (e.g., determine how to condense, group, and/or prioritize the data in view a role of the user and/or a past interaction of the user with the timeline 302 or other timelines corresponding to other industrial assets).

The timeline modifier window 308 is configured to comprise commands for modifying the content and/or scope of the timeline 302. By way of example, the timeline modifier window 308 may comprise a listing of available data types. A user may select "temperature" to view temperature data corresponding to the transformer and/or "outages" to view outage data corresponding to the transformer. Moreover, the user may customize the scope of the timeline 302 by specifying a beginning date and/or an end date of the timeline 302 and/or by using pre-defined links that are intended to cause a limited amount of information to be displayed. By way of example, the user may select temperature data from the past week to view merely temperature data acquired during the preceding week. As another example, the user may select outages lasting less than 3 days to view merely those outages that lasted less than three days (e.g., with longer outages being hidden or presented in a less distinctive manner).

The timeline modifier window 308 can also be used to facilitate the input of additional data pertaining to the transformer and/or the deletion of data pertaining to the transformer. By way of example, a user may add an image to the timeline 302 via the timeline modifier window 308. In some embodiments, based upon the addition of the image, a system may be configured to update an underlying source from which similar types of data (e.g., image data) were initially retrieved to construct the timeline 302. As another example, a user may identify a report that has been mistakenly categorized as being associated with the transformer (e.g., when in fact it was associated with a different transformer) and may highlight the report to delete such data from the timeline 302 (e.g., and update a source of the report to reflect that the report is not associated with the transformer).

In some embodiments, a user may engage the timeline 302 to view additional data pertaining to the transformer. For example, the user may use the select feature 318, may click on a portion of the timeline, etc. to highlight a portion of the timeline 302 that is of interest and/or to select a displayed event. For example, upon the selection of the Jun. 16, 1984 event, the timeline 302 may be updated to present the timeline 302 in a second manner, as shown in FIG. 4a.

Figure 4A:
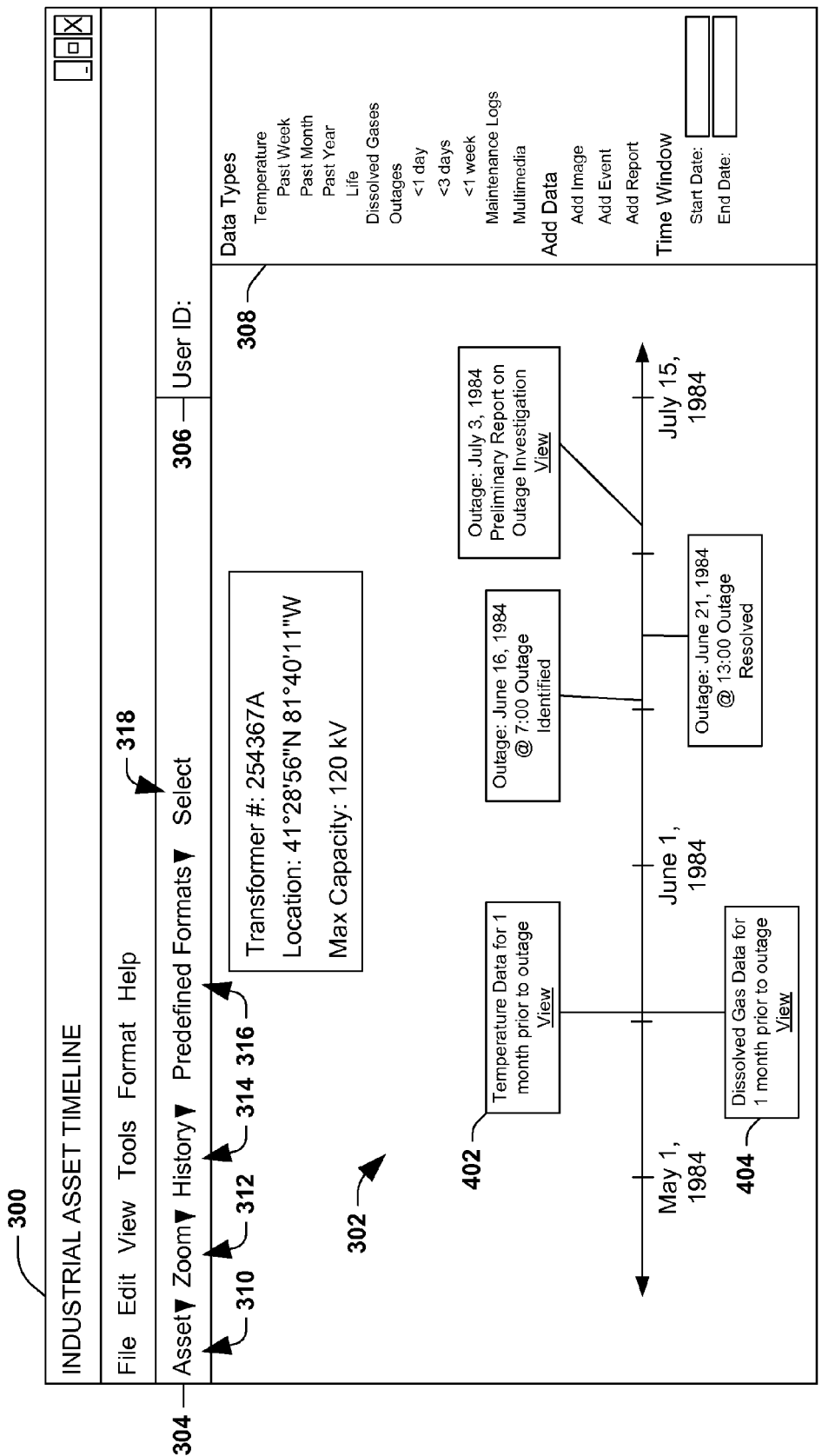
FIG. 4a illustrates an example graphical user interface of a program configured to display a timeline pertaining to an industrial asset.
Figure 4B:
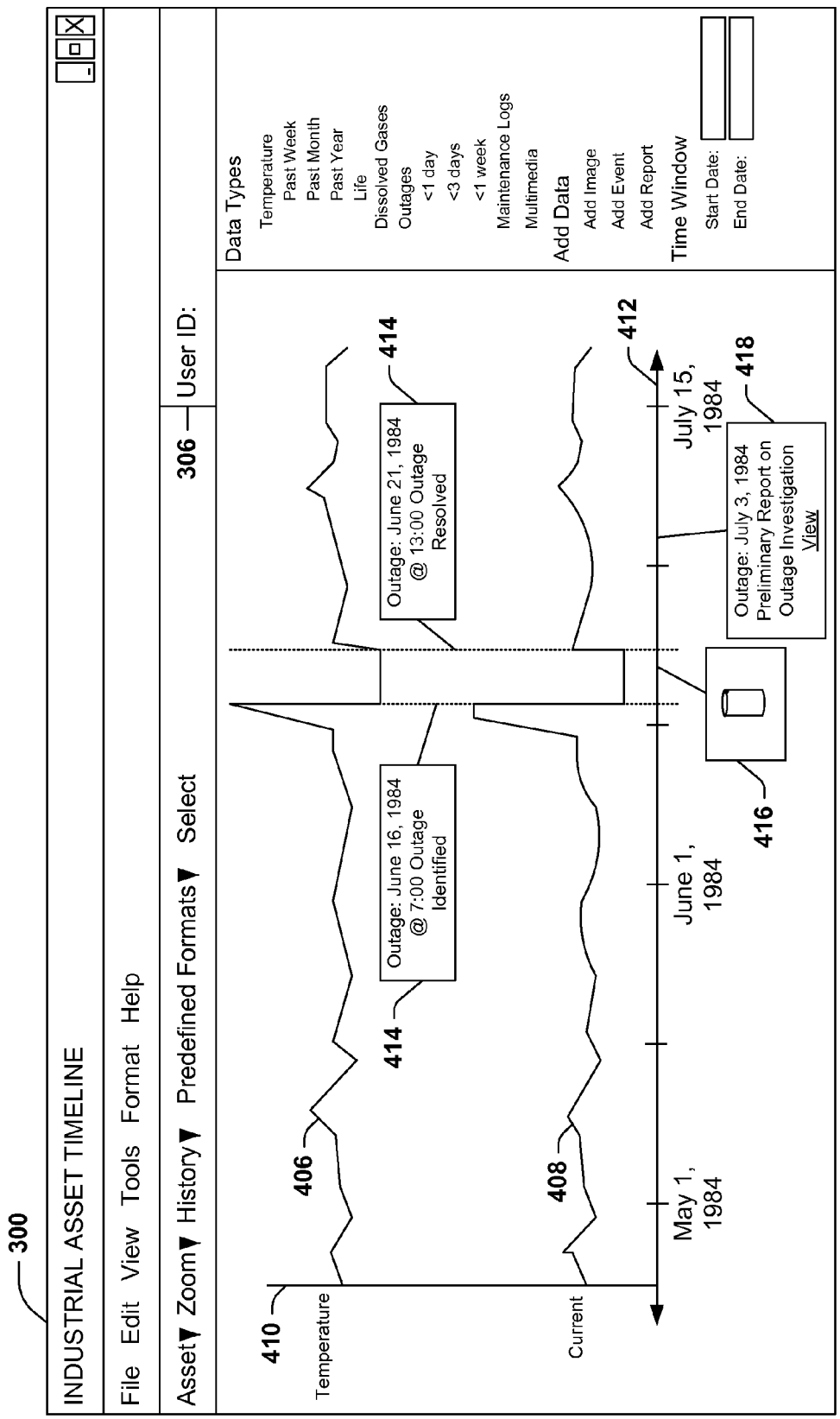
FIG. 4b illustrates an example graphical user interface of a program configured to display a timeline pertaining to an industrial asset.

At least some data presented in FIG. 3, while the timeline 302 was presented in the first manner, may be hidden and/or the distinctiveness of such data may be reduced when the timeline 302 is presented in the second manner as shown in FIG. 4a and/or a third manner as shown in FIG. 4b. Further, data that was hidden when the timeline 302 was presented in the first manner may be shown when the timeline 302 is presented in the second manner and/or the third manner.

More particularly, with respect to FIG. 4a, the timeline 302 is altered to depict events that occurred within a 1-2 month window of the Jun. 16, 1984 event that was selected in FIG. 3. Data that is often of interest when an outage occurs (e.g., as specified by a user and/or as determined by a training algorithm) may be shown in the timeline 302 since the Jun. 16, 1984 event was an outage. By way of example, when an outage occurs to a transformer, users may often seek to view temperature data and/or dissolved gas concentrations for the one month leading up to the outage. Accordingly, a first block 402 pertaining to such temperature information and a second block 404 pertaining to such dissolved gas information may be presented. The user may view the temperature information and/or the dissolved gas information by selecting a "view" hyperlink within respective blocks 402, 404. In another embodiment, such data may be presented directly within the timeline 302 so that the user does not have to navigate to another window to view such data.

The timeline 302 may further comprise additional blocks that comprise additional information pertaining to the outage, such as a more exact timeframe when the outage started and/or when the outage ended, and/or a preliminary report regarding why the outage occurred (e.g., which again may be viewed by selecting a "view" hyperlink). In some embodiments, a user may select an entry to view additional data and/or additional options regarding the selected entry. For example, the user may select a block to determine a source(s) of information presented within the block.

With respect to FIG. 4b, yet another approach is illustrated for depicting events that occurred within a 1-2 month window of the Jun. 16, 1984 event that was selected in FIG. 3. More particularly, a subset of data, such as temperature data 406 and/or current data 408 (e.g., respectively describing a temperature of and an amount of current through a transformer) may be represented on a first axis 410 (e.g., a y-axis) and time may be represented on a second axis 412 (e.g., an x-axis). In this way, a user can view information indicative of an operating state of the transformer during the time leading up to the outage directly within the timeline (e.g., instead of selecting boxes to view such data as described with respect to FIG. 4A). Further, the user can compare data yielded from sensors or other substantially continuous data producing devices (e.g., such as temperature data, current data, etc.) with data from discrete events, such as data describing the outage 414, images or other multimedia 416 of the transformer acquired during the outage, and/or reports 418 explaining the outage, for example.

It is to be appreciated that the graphical user interface 300 illustrated in FIGS. 3-4 list merely example features and/or elements which may be included in a graphical user interface and the scope of the application, including the scope of the claims, is not intended to be limited to such features and/or elements, for example. By way of example, FIGS. 3-4 illustrate the timeline 302 as being scaled linearly. In other embodiments, the timeline may be scaled differently. For example, the timeline 302 may be scaled logarithmically and/or may be fish-eyed (e.g., where a first portion of the timeline has a first scale and one or more other portions have a second scale (e.g., the first portion is enlarged relative to the one or more other portions)). As another example, the data may be chronologically arranged vertically (e.g., the timeline 302 is parallel to a vertical axis) as opposed to horizontally as shown in FIGS. 3-4.

Figure 5:
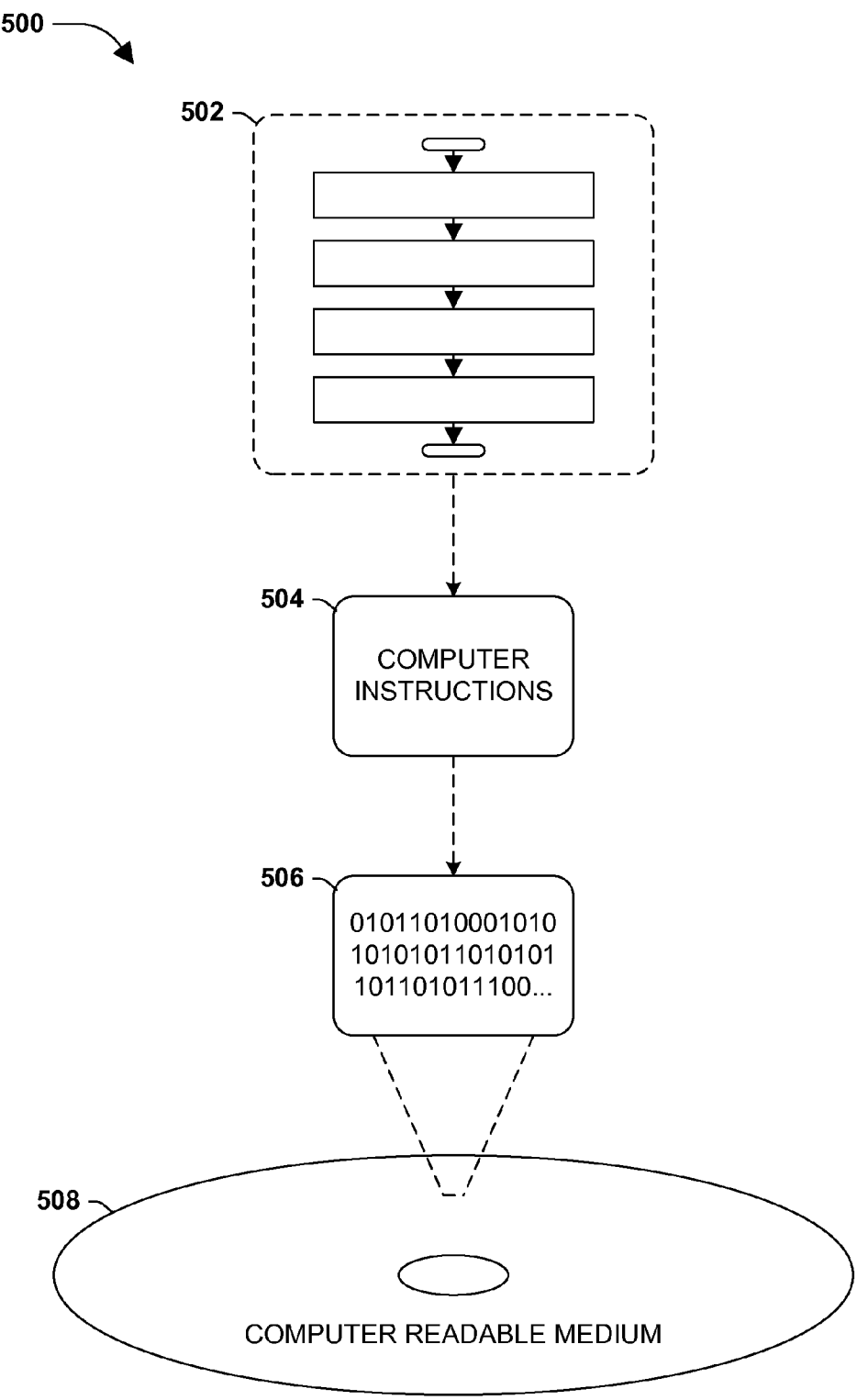
FIG. 5 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An example computer-readable medium that may be devised in these ways is illustrated in FIG. 5, wherein the implementation 500 comprises a computer-readable medium 502 (e.g., a flash drive, CD-R, DVD-R, application-specific integrated circuit (ASIC), field-programmable gate array (FPGA), a platter of a hard disk drive, etc.), on which is encoded computer-readable data 504. This computer-readable data 504 in turn comprises a set of processor-executable instructions 506 that when executed via a processing unit(s) is configured to operate according to one or more of the principles set forth herein. In some embodiments, the processor-executable instructions 506 may be configured to perform a method 508, such as at least some of the example method 100 of FIG. 1 and/or at least some of example method 200 of FIG. 2, for example. In other embodiments, the processor-executable instructions 506 may be configured to implement a system, such as at least some of the example system 600 of FIG. 6. Many such computer-readable media may be devised by those of ordinary skill in the art that are configured to operate in accordance with one or more of the techniques presented herein.

Figure 6:
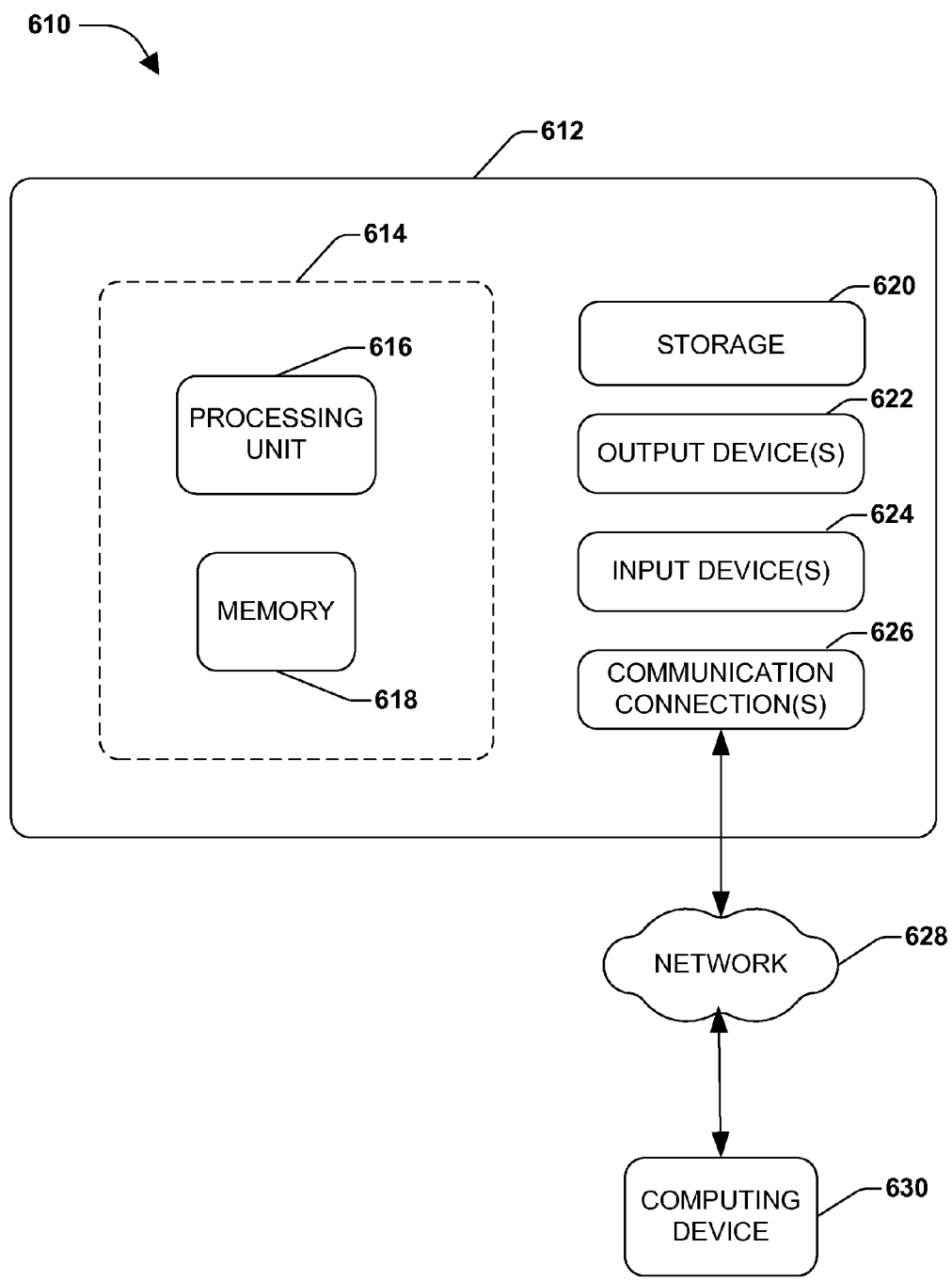
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 610 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example), or some combination of the two. This configuration is illustrated in FIG. 6 by dashed line 614.

In other embodiments, device 612 may include additional features and/or functionality. For example, device 612 may also include additional storage (e.g., removable and/or non-removable) including, but not limited to, magnetic storage, optical storage, and the like. Such additional storage is illustrated in FIG. 6 by storage 620. In one embodiment, computer readable instructions to implement one or more embodiments provided herein may be in storage 620. Storage 620 may also store other computer readable instructions to implement an operating system, an application program, and the like. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, or any combination thereof. In one embodiment, an input device or an output device from another computing device may be used as input device(s) 624 or output device(s) 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer readable instructions may be distributed across a network. For example, a computing device 630 accessible via a network 628 may store computer readable instructions to implement one or more embodiments provided herein. Computing device 612 may access computing device 630 and download a part or all of the computer readable instructions for execution. Alternatively, computing device 612 may download pieces of the computer readable instructions, as needed, or some instructions may be executed at computing device 612 and some at computing device 630.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Further, unless specified otherwise, "first," "second," and/or the like are not intended to imply a temporal aspect, a spatial aspect, an ordering, etc. Rather, such terms are merely used as identifiers, names, etc. for features, elements, items, etc. (e.g., "a first channel and a second channel" generally corresponds to "channel A and channel B," where channel A and channel B may be two different channels, two identical channels, or the same channel.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. Similarly, illustrated ordering(s) of acts is not meant to be limiting, such that different orderings comprising the same of different (e.g., numbers) of acts are intended to fall within the scope of the instant disclosure. In addition, while a particular feature of the disclosure may have been disclosed with respect to only one of several implementations, such feature may be combined with one or more other features of the other implementations as may be desired and advantageous for any given or particular application.

What is claimed is:

1. A method for chronicling events pertaining to an industrial asset, comprising:
   receiving data pertaining to an industrial asset from a plurality of sources;
   organizing the data chronologically, the organizing comprising altering first date information associated with a first portion of the data to standardize the first date information with second date information associated with a second portion of the data in response to the first date information having a different format than the second date information;
   grouping the data into a first set of bins, where a first bin of the first set of bins represents first data yielded from a first source of the plurality of sources and a second bin of the first set of bins represents second data yielded from a second source of the plurality of sources;
   creating a prioritization rule used to prioritize data for presentation within a timeline for the industrial asset;
   training the prioritization rule based upon a user previously interacting, on a previous timeline for the industrial asset, with a first type of data to a greater extent than a second type of data where the first type of data corresponds to the first data and the second type of data corresponds to the second data;
   prioritizing the data using the prioritization rule, the first data prioritized higher than the second data; and
   providing for presentation of the timeline of the data in a first manner to chronicle events pertaining to the industrial asset, where the first data is displayed more prominently in the timeline than the second data based upon the first data being prioritized higher than the second data.

2. The method of claim 1, the prioritizing comprising:
   prioritizing the first data higher than the second data based upon a first nature of the first data being more related to a present operating state of the industrial asset relative to a second nature of the second data.

3. The method of claim 1, comprising:
   condensing the data to reduce an amount of duplicate data.

4. The method of claim 1, the grouping comprising:
   grouping the data into the first set of bins according to an asset-type specific set of rules.

5. The method of claim 1, the grouping comprising:
   grouping the data into the first set of bins based upon user input.

6. The method of claim 1, the grouping comprising:
   grouping the data into the first set of bins based upon a present operating state of the industrial asset.

7. The method of claim 1, comprising:
   regrouping the data into a second set of bins to facilitate presentation of the timeline in a second manner.

8. The method of claim 1, the prioritizing comprising:
   prioritizing the first data higher than the second data based upon a first nature of the first data being more related to a present operating state of the industrial asset relative to a second nature of the second data, the present operating state corresponding to either a normal operating state or an abnormal operating state.

9. The method of claim 1, the prioritizing comprising:
   prioritizing the first portion of the data higher than the second portion of the data, the first portion of the data more temporally proximate to an event of interest relative to the second portion of the data.

10. The method of claim 1, the providing for presentation of the timeline:
    displaying the first data through the timeline; and
    hiding the second data within the timeline.

11. The method of claim 10, comprising:
    responsive to receiving input indicative of a selection of a portion of the timeline associated with the second data, displaying the second data.

12. The method of claim 1, comprising:
    receiving input indicative of a selection of a portion of the timeline, the selected portion of the timeline corresponding to selected data; and
    providing for presentation of the timeline in a second manner, the second manner presenting the selected data differently than the first manner.

13. The method of claim 1, comprising:
    maintaining a record of how one or more users previously interacted with the previous timeline;
    utilizing the record to predict how users with a first role will interact with the timeline; and
    utilizing the record to predict how users with a second role will interact with the timeline.

14. A system for chronicling events pertaining to an industrial asset, comprising:
    one or more processing units; and
    memory configured to store instructions that when executed by at least some of the one or more processing units perform a method, comprising:
      receiving data pertaining to an industrial asset from a plurality of sources;
      organizing the data chronologically, the organizing comprising altering first date information associated with a first portion of the data to standardize the first date information with second date information associated with a second portion of the data in response to the first date information having a different format than the second date information;
      grouping the data into a first set of bins, where a first bin of the first set of bins represents first data yielded from a first source of the plurality of sources and a second bin of the first set of bins represents second data yielded from a second source of the plurality of sources;
      creating a prioritization rule used to prioritize data for presentation within a timeline for the industrial asset;

training the prioritization rule based upon a user previously interacting, on a previous timeline for the industrial asset, with a first type of data to a greater extent than a second type of data where the first type of data corresponds to the first data and the second type of data corresponds to the second data;

prioritizing the data using the prioritization rule, the first data prioritized higher than the second data; and providing for presentation of the timeline of the data in a first manner to chronicle events pertaining to the industrial asset, where the first data is displayed more prominently in the timeline than the second data based upon the first data being prioritized higher than the second data.

15. The system of claim 14, the prioritizing comprising:
prioritizing the data as a function of a role of a user to whom the timeline is to be presented relative to the industrial asset.

16. The system of claim 14, the method comprising:
developing a set of prioritization rules as a function of past user interaction with the previous timeline.

17. The system of claim 14, the method comprising:
developing a set of prioritization rules as a function of a present operating state of the industrial asset.

18. The system of claim 14, the timeline representing numerical data and multimedia data.

19. The system of claim 14, the method comprising:
condensing the data to
reduce an occurrence of redundant data associated with a frequently occurring event.

20. A non-transitory computer-readable medium having stored thereon instructions for performing a method for chronicling events pertaining to an industrial asset, the method comprising:

receiving data pertaining to an industrial asset from a plurality of sources;

organizing the data chronologically, the organizing comprising altering first date information associated with a first portion of the data to standardize the first date information with second date information associated with a second portion of the data in response to the first date information having a different format than the second date information;

grouping the data into a first set of bins, where a first bin of the first set of bins represents first data yielded from a first source of the plurality of sources and a second bin of the first set of bins represents second data yielded from a second source of the plurality of sources;

creating a prioritization rule used to prioritize data for presentation within a timeline for the industrial asset;

training the prioritization rule based upon a user previously interacting, on a previous timeline for the industrial asset, with a first type of data to a greater extent than a second type of data where the first type of data corresponds to the first data and the second type of data corresponds to the second data;

prioritizing the data using the prioritization, the first data prioritized higher than the second data; and providing for presentation of the timeline of the data in a first manner to chronicle events pertaining to the industrial asset, where the first data is displayed more prominently in the timeline than the second data based upon the first data being prioritized higher than the second data.

* * * * *